Patented May 11, 1948

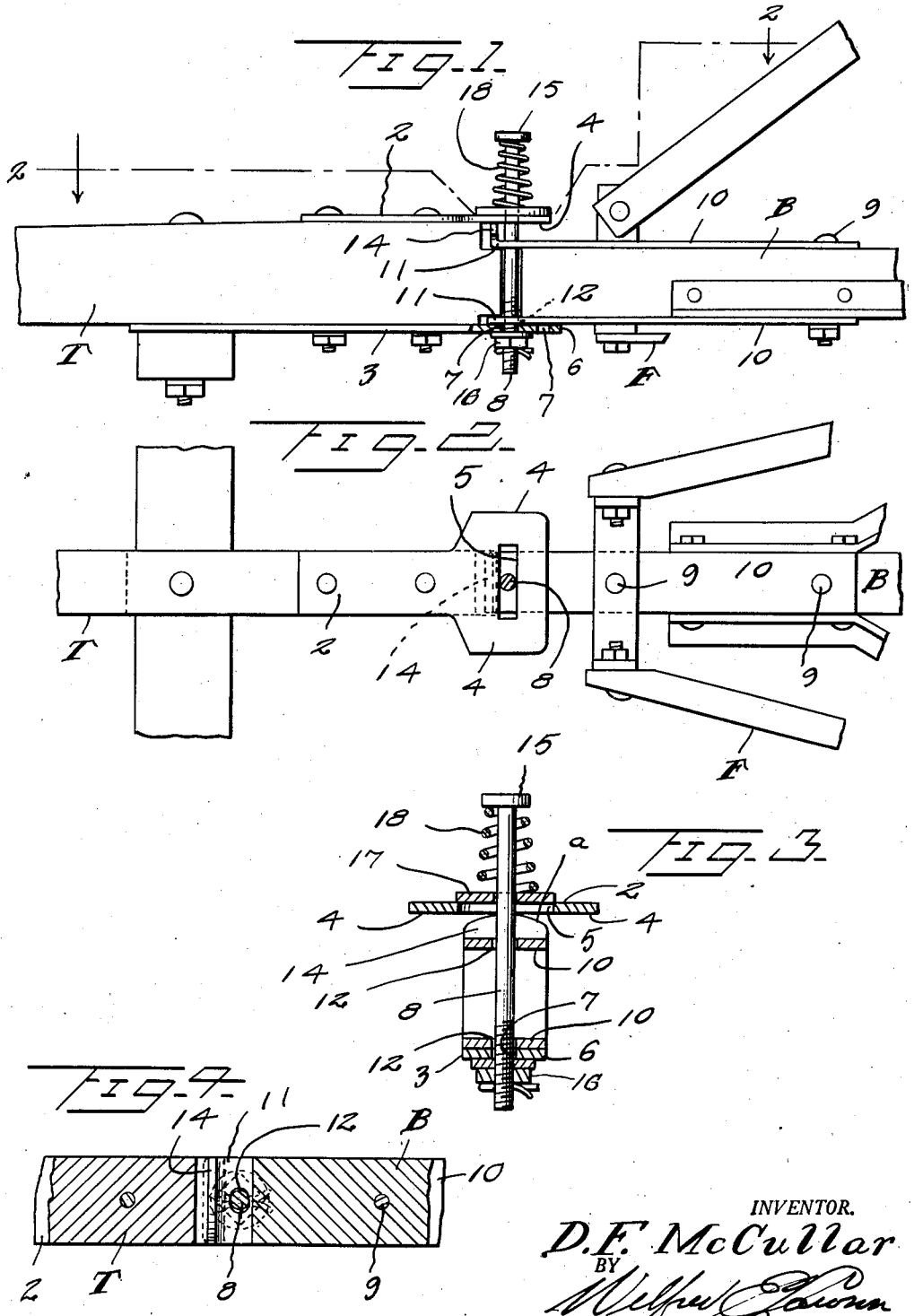

2,441,430

UNITED STATES PATENT OFFICE 2,441,430

ROTATOR HINGE

David F. McCullar, Lawrenceburg, Tenn.

Application April 26, 1945, Serial No. 590,376

5 Claims. (Cl. 287—100)

This invention relates to a rotator hinge and it is primarily an object of the invention to provide a structure of this kind particularly adapted for use in connecting the tongue of a horse drawn farm implement to the beam of such implement and wherein said hinge allows for limited rocking movement of the beam from side to side so that the implement, such as a plow, cultivator, scratcher, or the like, may be used with maximum efficiency when following curved rows or working circuitous contours or terraced lands.

It is also an object of the invention to provide a rotator hinge or coupler for connecting the draw bar or tongue and the beam of a farm implement, particularly of a walking type, whereby the implement is permitted limited lateral rocking movement but with liability of the implement turning over on its side substantially eliminated.

An additional object of the invention is to provide a rotator hinge or coupler for connecting a tongue or draw bar with the beam of a farm implement in a manner whereby the connection is rigid as pertains to straight pull or push but allows for limited lateral rocking movement in either direction of the pull bar or tongue and the beam one with respect to the other.

It is also an object of the invention to provide a rotator hinge or coupler for use in connection with a farm implement to couple or connect a tongue or draw bar with the beam of the implement and wherein the hinge is so constructed and assembled to add no material weight to the implement or to entail undue additional cost.

The invention consists in the details of construction and in the combination and arrangement of the several parts of my improved rotator hinge whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in side elevation illustrating a rotator hinge constructed in accordance with an embodiment of the invention;

Figure 2 is a view in top plan with a part in section of the structure as illustrated in Figure 1, the line of section being indicated by the line 2—2 of Figure 1;

Figure 3 is a transverse sectional view with parts in elevation taken through the hinge as herein embodied; and Figure 4 is a fragmentary horizontal sectional view taken through the hinge.

In the accompanying drawings is illustrated a rotator hinge or coupler embodying my invention employed in connection with a cultivator but it is believed to be obvious that the invention may be employed with other types of farm implements particularly of a walking type and drawn by draft animals.

In the embodiment of the invention, as illustrated in the accompanying drawings, B denotes the beam of a farm implement F, and T the tongue or draw bar. This draw bar or tongue may also be called a front beam section.

The rear end portion of the tongue or draw bar T has bolted thereto, as at 1, or otherwise firmly secured to the top and bottom faces thereof, the elongated rigid plates 2 and 3 extending a desired distance beyond the adjacent end of the tongue or bar T.

The extended portion of the upper plate 2 is laterally enlarged, as at 4, to extend beyond opposite sides of the plate proper and this extended portion of the upper plate 2 is provided directly in advance of the tongue or bar T with a transversely disposed straight slot 5 preferably of a length not less than the width of the adjacent end portion of the beam B.

The extended portion 6 of the lower plate 3 at the transverse center of the adjacent end of the tongue or bar T is provided with the longitudinally spaced openings 7, herein disclosed as two in number. These openings 7 are adapted to have selectively inserted therethrough the lower portion of the king pin 8 comprised in the structure and as determined by the depth desired for the implement to operate.

The forward portion of the beam B has secured to its top and bottom faces, by the bolt 9, or the like, the rigid plates 10 which extend in advance of the adjacent end of the beam B and for a distance to have overlapping relation with the extended portions 34 and 6 of the plates 2 and 3 respectively. The extended portions 11 at the transverse center of the adjacent end of the beam B are provided with the openings 12, the opening 12 of the lower plate selectively registering with an opening 7 in the extended portion 6 of the plate 3 while the opening 12 in the top plate 10 registers with the slot 5 in the extended portion 4 of the plate 2.

The extended portions 11 of the plates 10 are freely received between the extended portions 4 and 6 of the plates 2 and 3 with the extended portion 11 of the plate 10 resting from above upon the extended 6 of the lower plate 3. The major part of the extended portion 11 of the upper or top plate 10 is spaced below the extended portion 4 of the top plate 2 a distance sufficient to allow limited rocking movement as determined by the length of the slot 5 of the tongue T and beam B one with respect to the other.

The outer end of the top plate 10 is provided with an upstanding flange 14, the upper edge $a$ being disposed on a predetermined curvature and of such radius as to allow said edge $a$ to have rolling contact from below with the extended portion 4 of the top plate 2 at all times to prevent relative up and down movement of the beam B and the tongue or bar T one with respect to the other.

The king pin 8 is inserted from above through the slot 5, the openings 12, and the selected opening 7 in the extended portion 6 of the plate 3. When it is desired that the implement F have deep penetration in the ground being treated, the pin 8 is inserted through one of the openings 7 and when a lesser depth is required said pin 8 is inserted through the other opening 12.

The king pin 8 is of a length, in the assembly of the rotator hinge or coupler, to extend a material distance above the upper plate 2 and the top extremity of the pin 8 is provided with an enlargement or head 15 while the portion of the king pin below the lower plate 3 has removably engaged therewith a holding member 16. Interposed between the enlargement or head 15 and a washer 17 surrounding the king pin 8 and resting from above on the extended portion 4 of the plate 2, is an expansible member 18. This member 18 is herein disclosed as a coil spring encircling the king pin 8 and is of sufficient tension to maintain the king pin 8 in effective working position yet allowing for the desired relative lateral rocking movement of the beam B and the tongue or bar T one with respect to the other.

When the farm implement F is in use the main draft or pull is through the bottom plates 3 and 10 and as the top plate 10 is at no time tight, the slot 5 will allow the pin 8 to readily move therealong and thus affording easy movement for laterally rotating and guiding the beam B and the implement F associated therewith.

The slot 5 is preferably of a length to allow the beam B with the implement F to be laterally rocked about 30° right or left and during such lateral movements the king pin 8 will slide in the slot 5 to accommodate such movement and the spring 18 will make such movements more flexible since when the beam B and the implement F associated therewith is rocked or rotated to either side, the tension of the spring 18 is increased and its release helps to right the implement F hence facilitating guiding along rows or drills.

It is also to be noted that the rotator hinge or coupler allows relative side to side horizontal movements of the beam B and the tongue or bar T, one with respect to the other, up to approximately 45°. By this double action afforded by this hinge or coupler, namely, horizontal swinging movements from side to side and laterally rocking or tilting movements from side to side, the farm implement will operate easily and successfully on steep hill lands, sloping lands, crooked or curved rows, and all elevations and, of course, operating with required facility on level land and straight rows.

From the foregoing description it is believed to be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A rotator hinge for coupling together opposing ends of beam sections of a farm implement or the like comprising vertically spaced top and bottom plates carried by each of the beam sections and having extended portions extending beyond the said ends thereof, the extended portions of the plates of one section overlapping the extended portions of the plates of the second section, the extended portion of the top plate of one beam section being below and spaced from the extended portion of the top plate of the second beam section, said extended portion of the top plate of the second beam section being provided with a slot directed transversely of the beam sections, the extended portions of the remaining plates having openings, and a king pin extending through the slot and openings of the plates.

2. A hinge as set forth in claim 1 wherein the extended portion of the top plate of the first beam section is provided at its outer extremity with an upstanding flange having a curved top edge in rolling contact with the extended portion of the top plate of the second beam section.

3. A hinge as set forth in claim 1, with an expansion spring connected between the top plate of the second beam section and the adjacent end of the pin.

4. A rotator hinge for coupling together opposing ends of two beam sections of a farm implement or the like, comprising vertically spaced top and bottom plates carried by each of the beam sections and having portions extending beyond the said ends thereof, the extended portions of the plates of one section being in overlapping relation with the extended portions of the plates of the second section, the extended portion of the top plate only of the said one beam section being spaced from the extended portion of the top plate of the second beam section and terminating in an upstanding flange having an arcuate edge contour having rolling contact wtih the adjacent extended portion of the top plate of the second beam section, the said extended portion of the top plate of the second beam section having a slot which is directed transversely of the beam sections, the extended portions of the remaining plates having apertures therethrough, a pin extending through the slot and the apertures of the plates, a member carried by the lower end of the pin and engaging the underside of the lowermost plate, and a spring encircling the upper end of the pin and bearing upon the uppermost one of the plates and connected with the pin.

5. A hinge coupling of the character stated in claim 4, wherein the lowermost one of the plates has a plurality of apertures extending longitudinally of the extended portion thereof for adjusting the connection of the lower end of the pin with the lowermost plate.

DAVID F. McCULLAR.

REFERENCES CITED

The following references are of record in the file of this patent:

UNITED STATES PATENTS

| Number | Name | Date |
|---|---|---|
| 1,060,013 | Odenrider | Apr. 29, 1913 |
| 1,085,190 | Bennett | Jan. 27, 1914 |
| 1,159,043 | Keeler | Nov. 2, 1915 |